(12) United States Patent
Padi et al.

(10) Patent No.: US 9,621,954 B2
(45) Date of Patent: Apr. 11, 2017

(54) PROGRAM GUIDE INCLUDING ONLINE CHANNELS

(75) Inventors: Anil K. Padi, Irving, TX (US); Satish K. Singh, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 447 days.

(21) Appl. No.: 13/029,505

(22) Filed: Feb. 17, 2011

(65) Prior Publication Data

US 2012/0216228 A1    Aug. 23, 2012

(51) Int. Cl.
*G06F 3/00* (2006.01)
*H04N 21/462* (2011.01)
*H04N 21/4782* (2011.01)
*H04N 21/482* (2011.01)

(52) U.S. Cl.
CPC ..... *H04N 21/4622* (2013.01); *H04N 21/4782* (2013.01); *H04N 21/4823* (2013.01)

(58) Field of Classification Search
USPC ..................................................... 725/37–61
See application file for complete search history.

(56) References Cited

U.S. PATENT DOCUMENTS

| | | | | |
|---|---|---|---|---|
| 2001/0012024 A1* | 8/2001 | Rosin et al. | .................. | 345/841 |
| 2002/0042813 A1* | 4/2002 | Ullman et al. | ................ | 709/203 |
| 2003/0037335 A1* | 2/2003 | Gatto et al. | ..................... | 725/86 |
| 2004/0158856 A1* | 8/2004 | Grooters et al. | ................ | 725/39 |
| 2009/0133059 A1* | 5/2009 | Gibbs et al. | ..................... | 725/34 |
| 2009/0210909 A1* | 8/2009 | Mukerji et al. | .................. | 725/51 |
| 2010/0017824 A1* | 1/2010 | Malik | ................ | H04N 5/44543 725/46 |
| 2010/0114857 A1* | 5/2010 | Edwards | ........... | G06F 17/30817 707/709 |

* cited by examiner

*Primary Examiner* — Nathan Flynn
*Assistant Examiner* — Michael Telan (57) ABSTRACT

A method includes providing a programming guide including listings associated with a number of channels provided by a television service provider. The method may also include receiving, from a user, input corresponding to a request to add a listing in the programming guide associated with an online content provider, and providing a user interface requesting that the user add information associated with the online content provider. The method may further include receiving, via the user interface, an identifier associated with the online content provider, storing the identifier in a memory, and modifying the programming guide to include a listing associated with the online content provider.

21 Claims, 7 Drawing Sheets

| CHANNEL 502 | IDENTIFIER 504 | NAME 506 | LOGO 508 |
|---|---|---|---|
| 2001 | WWW.ESPN3 | ESPN ONLINE | |
| 2002 | WWW.YOUTUBE.COM | UTUBE | |
| ... | ... | ... | ... |

PROGRAM GUIDE INCLUDING ONLINE CHANNELS

BACKGROUND INFORMATION

Web sites frequently provide video feeds to allow consumers to view sporting events, television shows, etc., over the Internet As a result, consumers frequently view online programming provided by web sites via personal computers or other devices.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to customizing a programming guide to include listings associated with online content providers. A user may then select content associated with an online content provider for viewing in a similar manner that the user views conventional television programs. In one exemplary implementation, a user may interface with a set top box or other device to provide information associated with online content providers. The user-provided information may then be added to the programming guide. In some implementations, such as when an online content provider has a number of different video feeds that are available for downloading or streaming, the programming guide may display several selections associated with the single online content provider.

Figure 1:
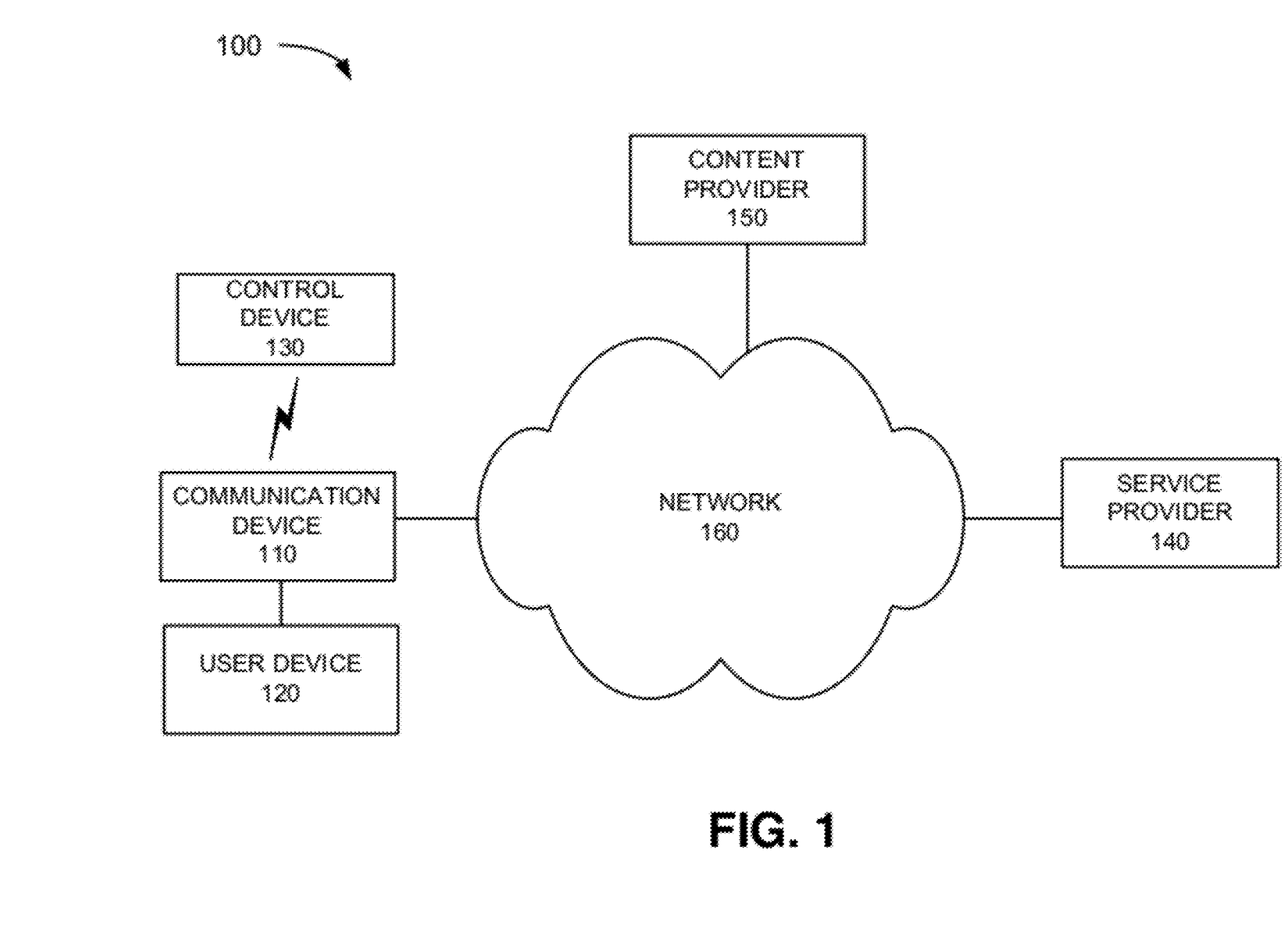
FIG. 1 illustrates an exemplary network in which systems and methods described herein may be implemented.

FIG. 1 is a block diagram of an exemplary network 100 in which systems and methods described herein may be implemented. Network 100 may include communication device 110, user device, control device 130, service provider 140, content provider 150 and network 160.

Communication device 110 may include any type of device that is able to receive data, such as text data, video data, image data, audio data, multi-media data, etc., transmitted from a source, such as service provider 140 and/or content provider 150. Communication device 110 may decode the data and output the data to an output device, such as user device 120, for viewing or playing. In an exemplary implementation, communication device 110 may include a set top box used to decode incoming multi-media data, such as multi-media data received from a television service provider, a cable service provider, a satellite system, a wireless system or some other wired, wireless or optical communication medium. The term "set top box" as used herein should be construed to include any device used to receive signals from an external source and output the signals for viewing or playing. In some implementations, communication device 110 may forward the decoded data for viewing or playing by another device, such as user device 120. In other implementations, communication device 110 may play and display the decoded media.

For example, in some implementations, communication device 110 may include some type of computer, such as a personal computer (PC), laptop computer, tablet computer, home theater PC (HTPC), etc., that is able to receive incoming data and decode the incoming data for output to a display, which may be included with communication device 110. In this instance, communication device 110 may include logic, such as a cable card, television card or other logic, to interface with service provider 140.

User device 120 may include any device that is able to output/display various media, such as a television, monitor, PC, laptop computer, HTPC, a personal digital assistant (PDA), a web-based appliance, a mobile terminal (e.g., a cellular telephone), a tablet computer, etc. In an exemplary implementation, user device 120 may receive multi-media data from communication device 110 and display or play the media.

Control device 130, also referred to herein as remote control 130, may include a device that allows a user to control programming and/or content displayed on user device 120 via interaction with communication device 110. In an exemplary implementation, remote control 130 may sends commands to communication device 110 via infrared (IR) or radio frequency (RF) signals. In addition, remote control 130 may allow a user to enter information to customize a television programming guide, such as an electronic program guide (EPG) provided by service provider 140, output by communication device 110 to user device 120, as described in detail below.

Service provider 140 may include one or more computing devices, servers and/or backend systems that are able to connect to network 160 and transmit and/or receive information via network 160. In one implementation, service provider 140 may include a server (e.g., a computer system or an application), a cable head-end, or a broadcasting device capable of providing multi-media content (e.g., TV programming, movies, on-demand services, live television, news feeds, blog feeds, pod casts, widgets, applications, etc.) to communication device 110 for output to a user/ viewer via output device 120. In some implementations, service provider 140 may forward or provide Internet protocol television (IPTV) programming to communication device 110 via network 160.

Content provider 150 may include one or more computing devices, servers and/or backend systems that are able to connect to network 160 and transmit and/or receive information via network 160. In an exemplary implementation, content provider 150 may include a server (e.g., a computer system and/or an application), a cable head-end, or a broadcasting device capable of providing multi-media content (e.g., sports programming, TV programming, movies, on-demand services, live television, news feeds, blog feeds, pod casts, widgets, applications, etc.) to communication device 110 for output to a user/viewer via user device 120. In one implementation, content provider 150 may be a web site that provides content to consumers that connect to content provider 150 via network 160.

Network 160 may include one or more wired, wireless and/or optical networks that are capable of receiving and transmitting data, voice and/or video signals, including multi-media signals that include voice, data and video information. For example, network 160 may include one or more public switched telephone networks (PSTNs) or other type of switched network. Network 160 may also include one or more wireless networks and may include a number of transmission towers for receiving wireless signals and forwarding the wireless signals toward the intended destinations. Network 160 may further include one or more satellite networks, one or more optical networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of receiving and transmitting data.

The exemplary configuration illustrated in FIG. 1 is provided for simplicity. It should be understood that a typical network may include more or fewer devices than illustrated in FIG. 1. For example, one communication device 110, one user device 120, one control device 130, one service provider 140, one content provider 150 and one network 160 are shown for simplicity. It should be understood that network 100 may include hundreds or thousands of communication devices 110, user devices 120, control devices 130, service providers 140, content providers 150, and/or networks 160. Network 100 may also include additional elements, such as switches, gateways, routers, backend systems, etc., that aid in routing information, such as media streams from service provider 140 and content provider 150 to communication device 110. In addition, although communication device 110 and user device 120 are shown as separate devices in FIG. 1, in other implementations, the functions performed by these devices may be performed by a single device or platform. Also, in some instances, one or more of the devices of network 100 may perform one or more functions described as being performed by another one or more of the devices of network 100.

Figure 2:
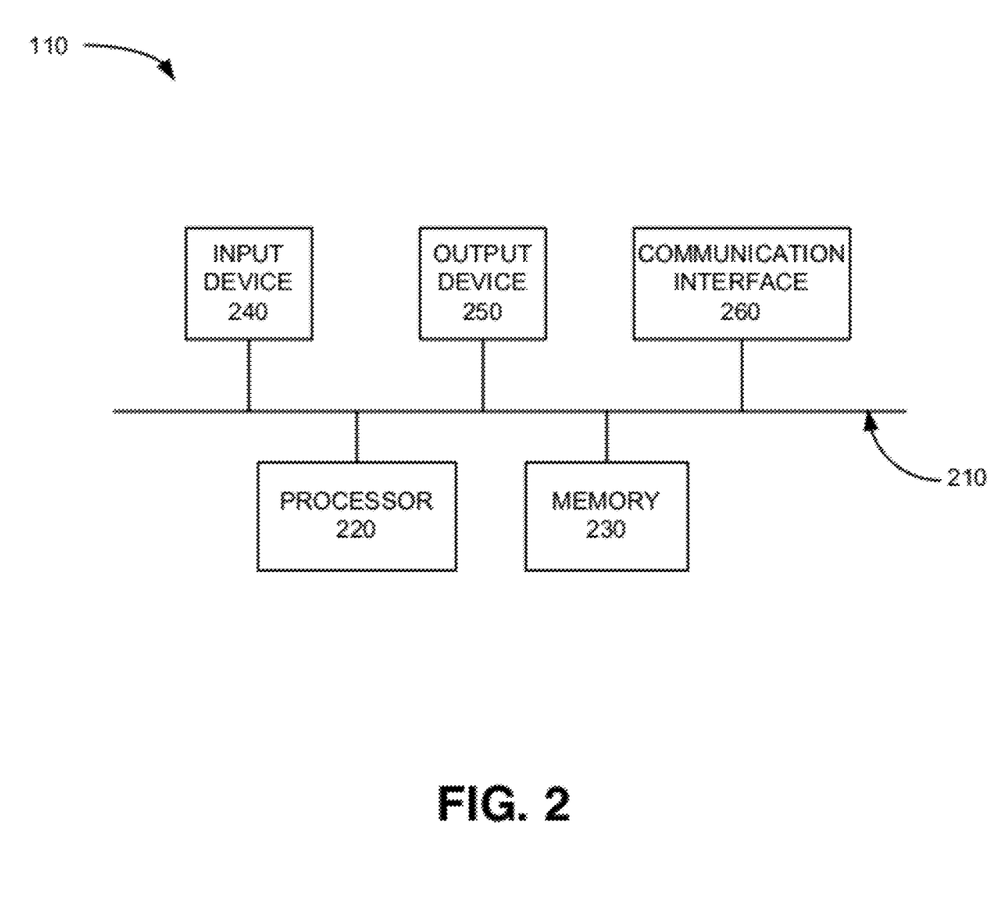
FIG. 2 illustrates an exemplary configuration of the communication device or one or more of the other devices of FIG. 1.

FIG. 2 illustrates an exemplary configuration of communication device 110. User device 120, control device 130, service provider 140 and/or content provider 150 may be configured in a similar manner. Referring to FIG. 2, communication device 110 may include a bus 210, a processor 220, a memory 230, an input device 240, an output device 250 and a communication interface 260. Bus 210 may include a path that permits communication among the elements of communication device 110.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive. In an exemplary implementation, memory 230 may store programming received from service provider 140 and/or content provider 150, as described in detail below.

Input device 240 may include a mechanism that permits a user to input information to communication device 110, such as a keyboard, a keypad, a mouse, a pen, a microphone, a touch screen, voice recognition and/or biometric mechanisms, etc. Input device 240 may also include mechanisms for receiving input via a remote control device (e.g., remote control 130) which sends commands to communication device 110 via IR or radio frequency signals. Output device 250 may include a mechanism that outputs information to the user, including a display, a printer, a speaker, etc.

Communication interface 260 may include a transceiver that communication device 110 may use to communicate with other devices (e.g., user device 120, control device 130, etc.), service provider 140 and/or content provider 150. For example, communication interface 260 may include mechanisms for communicating with user device 120, control device 130, service provider 140 and content provider 150 via wired, wireless or optical mechanisms. For example, communication interface 260 may receive television programming from service provider 140 and output television programming data to user device 120. Communication interface 260 may also include one or more radio frequency (RF) transmitters, receivers and/or transceivers and one or more antennas for transmitting and receiving RF data via network 160. Communication interface 260 may further include mechanisms for communicating with an "online content provider, such as content provider 150. In this case, communication interface 260 may receive streaming content from content provider 150 via network 160 (e.g., the Internet). Communication interface 260 may also include a modem or an Ethernet interface to a LAN or other mechanisms for communicating via a network, such as network 160 or another network, via which communication device 110 communicates with other devices/systems.

The exemplary configuration illustrated in FIG. 2 is provided for simplicity. It should be understood that communication device 110, user device 120, control device 130, service provider 140 and/or content provider 150 may include more or fewer devices than illustrated in FIG. 2. For example, various modulating, demodulating, coding and/or decoding components, one or more power supplies or other components may be included in one or more of communication device 110, user device 120, control device 130, service provider 140 and content provider 150.

Communication device 110, user device 120 and/or control device 130 may perform operations in response to their respective processors 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
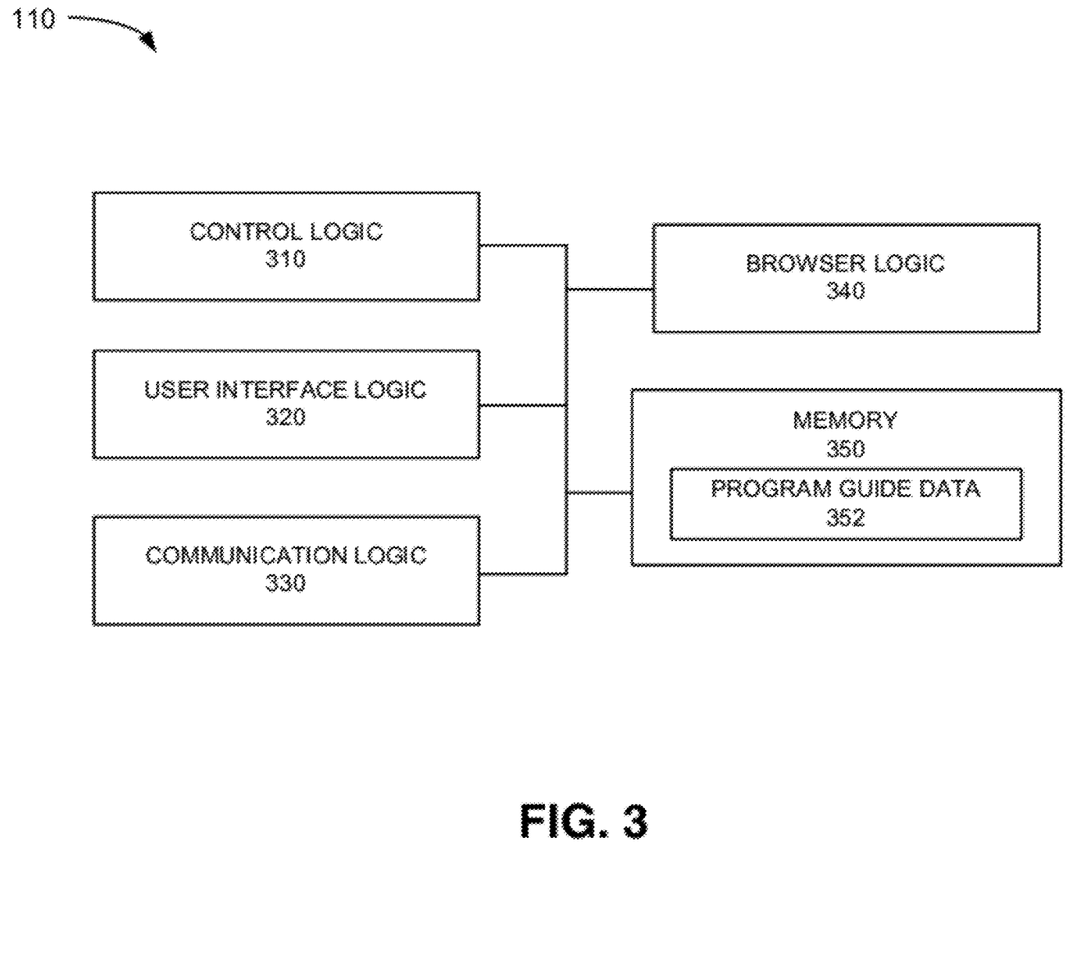
FIG. 3 illustrates an exemplary configuration of logic components implemented in the communication device of FIG. 1.

FIG. 3 is an exemplary functional block diagram of components implemented in communication device 110. In an exemplary implementation, all or some of the components illustrated in FIG. 3 may be stored in memory 230. For example, all or some of the components illustrated in FIG. 3 may be implemented by processor 220 executing software instructions stored in memory 230. Referring to FIG. 3, communication device 110 may include control logic 310, user interface logic 320, communication logic 330, browser logic 340 and memory 350.

Control logic 310 may include logic for controlling the operation of communication device 110. For example, control logic 310 may control the reception and display of program guide data that will be output to users via, for example, user device 120. In one implementation, control logic 310 may decode data, such as program guide data provided by service provider 140, to enable the received program guide data to be displayed by user device 120.

User interface logic 320 may include logic for allowing users to input information to communication device 110. For example, user interface logic 320 may provide a graphical user interface (GUI) that allows a user to select an option to add "channels," such as an online channels associated with content providers (e.g., content provider 150) to the programming guide displayed to a user. In this case, the GUI may facilitate entry of the online channel, including allowing the user to enter an address for the online channel (e.g., a uniform resource identifier (URI)), select a particular channel number for the new online "channel," input a name of the channel that will be displayed in the programming guide, select a channel logo to be displayed in the programming guide, etc., as described in detail below.

Communication logic 330 may include logic for communicating with, for example, service provider 140. For example, communication logic 330 may receive and decode a large number of programming channels from service provider 140, such as channels broadcasting televisions shows, sporting events, etc. Communication logic 330 may also include logic for communicating with content providers, such as content provider 150, via a network, such as the Internet.

Browser logic 340 may include logic for accessing and retrieving information via a network, such as the Internet. For example, browser logic 340 may include a web browser application for retrieving or accessing information on the Internet, such as information/content provided by content provider 150. Browser logic 340 may allow the content to be selected and streamed to communication device 110, similar to the streaming of information to a user's home computer. The selected content may be chosen by a user via remote control 130 and interaction with the GUI provided by user interface logic 320. Content provider 150 may receive the user's selection via browser logic 340 (or communication logic 330) and download the selected content to communication device 110 for output to user device 120.

Memory 350 may include one or more memories for storing data transmitted from service provider 140. For example, memory 350 may include program guide data 352 that stores television programming guide information for display by communication device 110 and/or user device 120. The programming guide information may include program listings for a large number of channels provided by service provider 140 via network 160. In an exemplary implementation, a user may customize the program guide data to include online channel information, as described in detail below.

The exemplary configuration illustrated in FIG. 3 is provided for simplicity. It should be understood that a typical communication device 110 may include more or fewer components than illustrated in FIG. 3. In addition, although the components illustrated in FIG. 3 are shown as separate components located in communication device 110, in other implementations, the functions performed by all or some of these components may be located externally from communication device 110. For example, some or all of the components illustrated in FIG. 3 may be located in user device 120, control device 130, and/or service provider 140. Also, in some instances, functions described as being performed by one or more of the components of FIG. 3 may be performed by another one or more of the components of FIG. 3.

Figure 4:
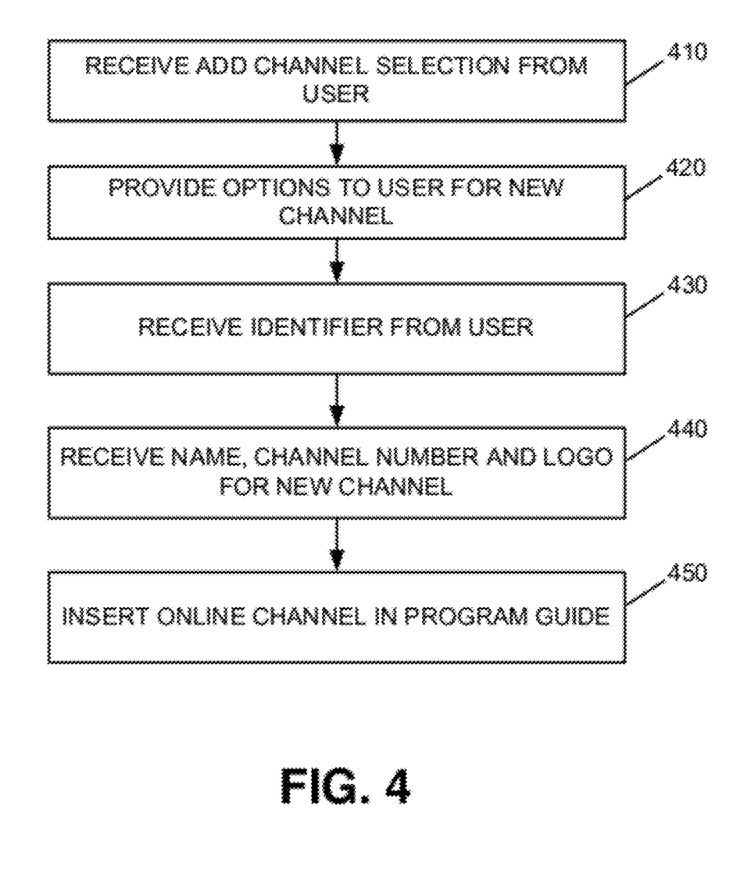
FIG. 4 is a flow diagram illustrating exemplary processing associated with customizing a program guide.

FIG. 4 is a flow diagram illustrating exemplary processing associated with customizing a program guide. In this example, assume that service provider 140 forwards an electronic program guide to communication device 110 for display via user device 120. The program guide may be stored in program guide data 352 in memory 350. The program guide data may include a listing of channels and television programs to be broadcast at particular times of the day. Processing may begin with a user accessing the program guide to make an addition or change to the standard program guide stored in memory 350 that is provided by service provider 140. For example, a user may interact with remote control 130 to retrieve and view the program guide via user device 120. In one implementation, the program guide displayed to the user may include an option, such as "Add Channel". The user may select, using remote control 130, the add channel option. Alternatively, remote control 130 may include an input/button labeled "add channel," or something similar, and the user may select the add channel option on remote control 130.

In either case, user interface logic 320 may receive the add channel selection (act 410). In response to receiving the add channel selection, user interface logic 320 may output a GUI screen on user device 120 that includes an input box along with instructions for the user to input a name or identifier associated with the desired new channel (act 420). For example, the input box/instructions may request that the user enter a uniform resource identifier (URI), a uniform resource locator (URL), or some other type of identifier associated with the online/Internet accessible channel to be added to the program guide.

As an example, assume that the user would like to add ESPN3 to the program guide. In this case, the use may enter the following URL: http://www.espn3.com, or simply espn3.com. In either case, user interface logic 320 may receive the user's input (act 430).

User interface logic 320 may also request that the user provide a name for the online channel, a channel number for the online channel and/or a channel logo for the online channel. For example, user interface logic 320 may display an input box for the user to enter a user-defined name for the channel, such as ESPN3, ESPN online, etc. User interface logic 320 may further display an input box to allow the user to enter a "virtual channel" number for the channel. For example, certain ones of the channel numbers available via the program guide may be "virtual channels" that are used to display the information of interest associated with the online content provider, as opposed to channel numbers associated with channels that are broadcast by service provider 140. The virtual channel number may be displayed for the online channel in the program guide along with the name inputted by the user. User interface logic 320 may also facilitate the selection of a logo to be displayed with the channel on the program guide. For example, user interface logic 320 may have a number of logos stored in memory 350 from which the user may select a logo for the new channel. User interface logic 320 may also allow the user to access a web site via network 160 to download a logo for the online channel.

Assume that the user has entered a name, channel number and selected a logo for the online channel via remote control 130. User interface logic 320 may receive the user-provided information associated with the online channel (act 440). Control logic 310 may then modify the standard program guide data stored in memory 352 to include the new channel (act 450). For example, suppose that the user has selected channel 2001 for ESPN3.com and has a selected a football icon for the logo. In this case, user interface logic 330 may store this information in memory 350.

Figure 5:
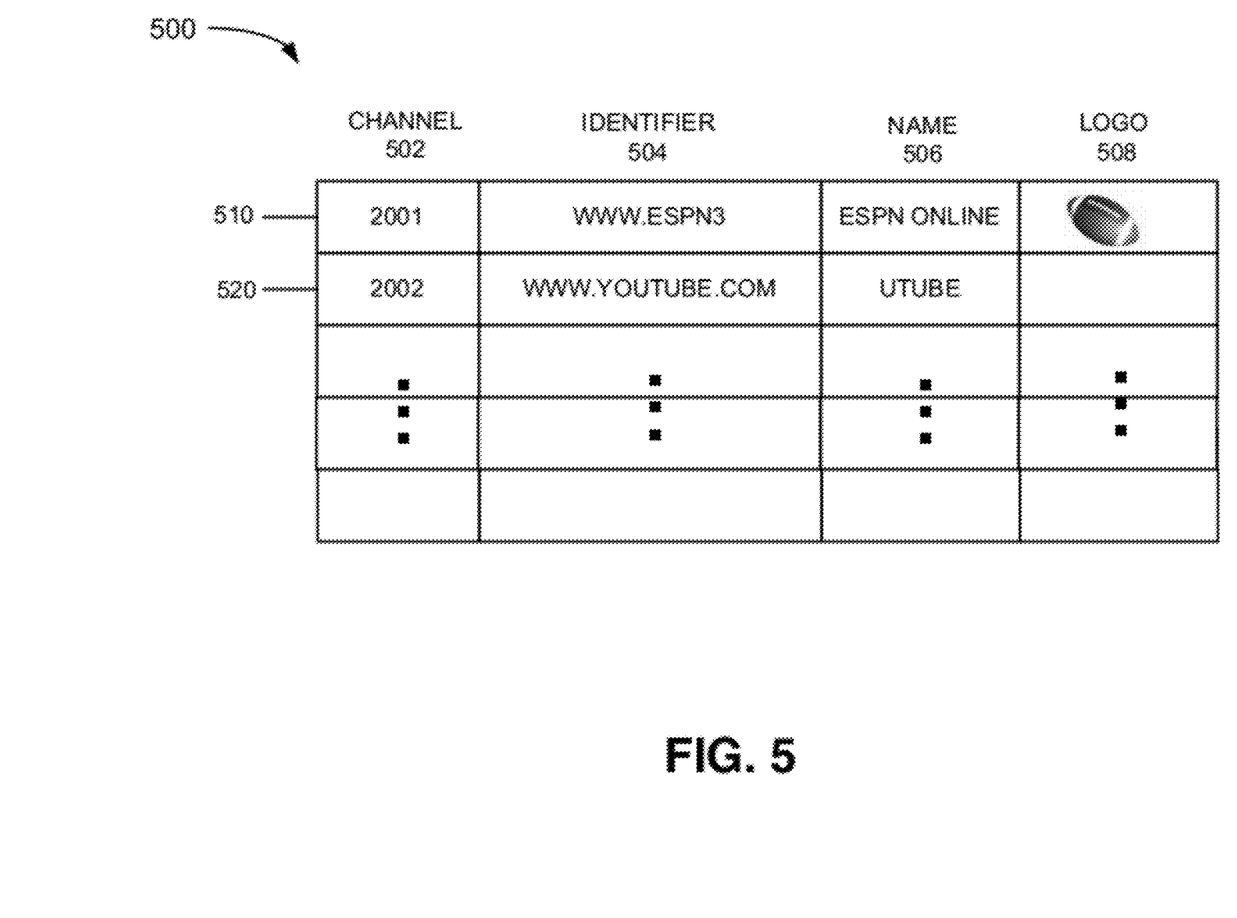
FIG. 5 is an exemplary table stored in the communication device of FIG. 2.

For example, FIG. 5 illustrates an exemplary table stored in memory 350. Referring to FIG. 5, table 500 includes channel field 502, identifier field 504, name field 506 and logo field 508. Channel field may include the channel number selected/input by the user. If no channel number is input/selected, user interface logic 320 may select any unused channel number as the channel number for the new online channel. Identifier field 504 may include the identifier (e.g., URI) input by the user (i.e., www.espn3.com in this example). Name field 506 may store the name entered by the user and logo field 508 may store a logo selected by the user. As illustrated, entry 510 in table 500 may store the channel number 2001 in field 502, the identifier www.espn3.com in field 504, the name espn online in field 506 and a football icon in field 508.

The user may enter additional online channels in a similar manner. For example, entry 520 in table 500 may store information entered by the user for a second online content provider. In this case, the user may have entered information associated with the web site www.youtube.com. The user-entered information may be stored in fields 502-506 of entry 520. Additional new channels may be entered in a similar manner.

Control logic 310 may access the information stored in table 500. Alternatively, user interface logic 320 may forward the information in table 500 to control logic 310. In either case, control logic 310 may modify the standard program guide provided by service provider 140 by inserting Channel 2001 into the program guide, along with the label ESPN online and the football logo (act 450). More particularly, control logic 310 may stored the encoded data in program guide data 352. Similarly, control logic 310 may insert Channel 2002 into the program guide, along with the name utube provided by the user.

In this manner, a user may add online "channels" to be displayed in the programming guide along with the broadcast channels provided by service provider 140. The user may also customize the guide to display the online channels with particular "virtual" channel numbers, as well as user-defined names and/or logos. The user-selected channel numbers, names and logos may make it easier for the user to remember the online channels he/she has added to the program guide.

Figure 6:
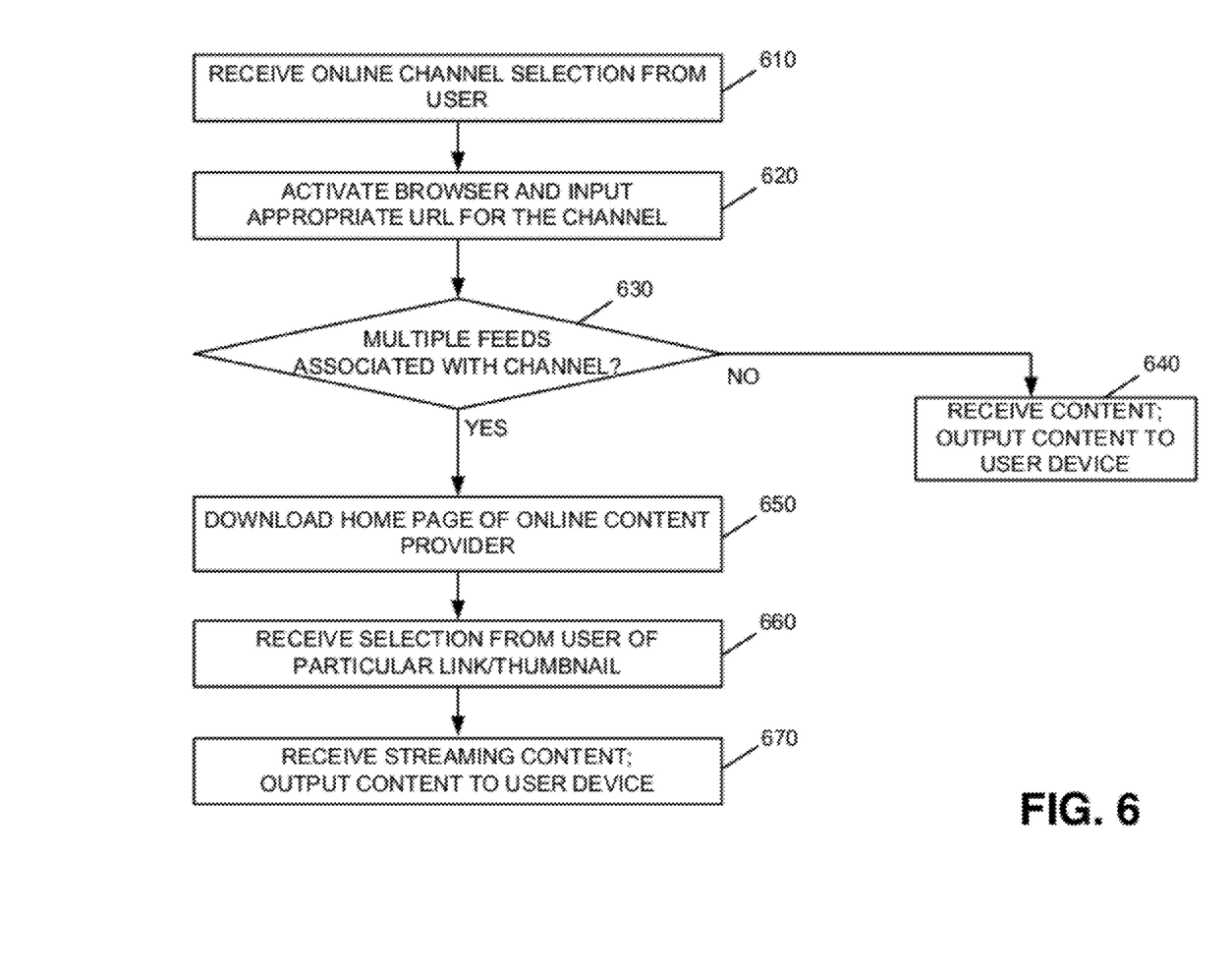
FIG. 6 is a flow diagram illustrating exemplary processing associated with viewing programming, including online content.

FIG. 6 illustrates exemplary processing with a user viewing programming identified via a program guide provided on communication device 110 and/or user device 120. Assume that communication device 110 is powered up and the user is watching television provided by service provider 140 and output to user device 120 (e.g., a television). Further assume that the user accesses the program guide by inputting a button/selection on remote control 130. As described previously, communication device 110 may receive a program guide from service provider 140 that includes channels available from service provider 140. The user, as described above with respect to FIGS. 3-5, may customize the program guide to add online virtual channels to the program guide displayed to the user.

In this case, assume that the user scrolls through the channels in the program guide and selects an online channel via remote control 130. For example, the user may select "OK" when the online channel of interest is displayed/highlighted. Communication device 110 receives the online channel selection via user interface logic 320 (act 610).

In this example, assume that the user selected Channel 2001, which corresponds to ESPN3.com. In this case, further assume that the user previously entered, via remote control 130, an identifier/URL associated with this online channel (e.g., www.espn3.com), as described above with respect to FIG. 4. The identifier may be stored in field 504 of entry 510 in table 500 (FIG. 5). After receiving the selection, browser logic 340 may retrieve the identifier stored in field 504 of entry 510 and access the web site http://www.espn3.com (act 620). In some implementations, after establishing contact with the web site, browser logic 340 may determine if there are multiple video feeds associated with the selected web site (act 630).

For example, if the web site is associated with a single streaming video source (act 630-no), browser logic 340 may download or stream the content associated with the selected channel to communication device 110 (act 640). Browser logic 340 or communication logic 330 may receive the content/stream and output the stream to user device 120 (act 640). In this manner, the user may view online media in a similar manner to television programming. That is, the user may simply select the channel associated with the online content provider via the program guide and view the content.

If, however, the web site is associated with multiple video feeds, browser logic 340 may download a home page associated with the web site (i.e., ESPN3.com in this example). Browser logic 340 or communication logic 330 may output the home page for display on user device 120 (act 650). The user may view the home page and select, via remote control 130, a link or an option on the home page to download a video feed from the web site. For example, assume that web site www.espn3 provides multiple feeds for different sporting events that may be occurring simultaneously (e.g., football games, basketball games, etc.). Further assume that the home page includes a number of "thumbnails," or links identifying each video feed that is currently available for downloading. For example, assume that ESPN is currently providing feeds for four different football games. In this case, browser logic 340 may download the home page that displays thumbnails or links to each of the four games.

Further assume that the user selects one of the thumbnails/links displayed on user device 120 via remote control 130. For example, the user may navigate to the particular thumbnail or link using a cursor or up/down arrow keys on remote control 130. User interface logic 320 may receive the selection (act 660). In this case, browser logic 340 may transmit the selection to content provider 150. Content provider 150 may receive the selection and download or stream the desired content to communication device 110. Control logic 310 may receive the streaming content and output the content to user device 120 (act 670). In this manner, the user may select one of multiple feeds that may be available via the online channel at any given time.

As described above, in some instances, the selected online content provider/web site may provide a single video feed that is available to users or viewers. In these instances, browser logic 340 and/or communication logic 330 may automatically provide the single video feed to user device 120 in response to selection of the channel associated with the online content provider that is displayed in the program guide. In other instances, however, browser logic 340 may provide a home page that includes thumbnails/links that list multiple feeds provided by the online content provider (e.g., content provider 150).

In some implementations, when the online content provider has a number of video feeds that are available for downloading, browser logic 340 and/or control logic 310 may automatically identify the available feeds in the program guide. For example, in instances where four football games are currently available for downloading from an online content provider, such as content provider 150, browser logic 340 may access the web site of the content provider and identify the available video feeds. Browser logic 340 may then automatically provide this information in the program guide.

Figure 7:
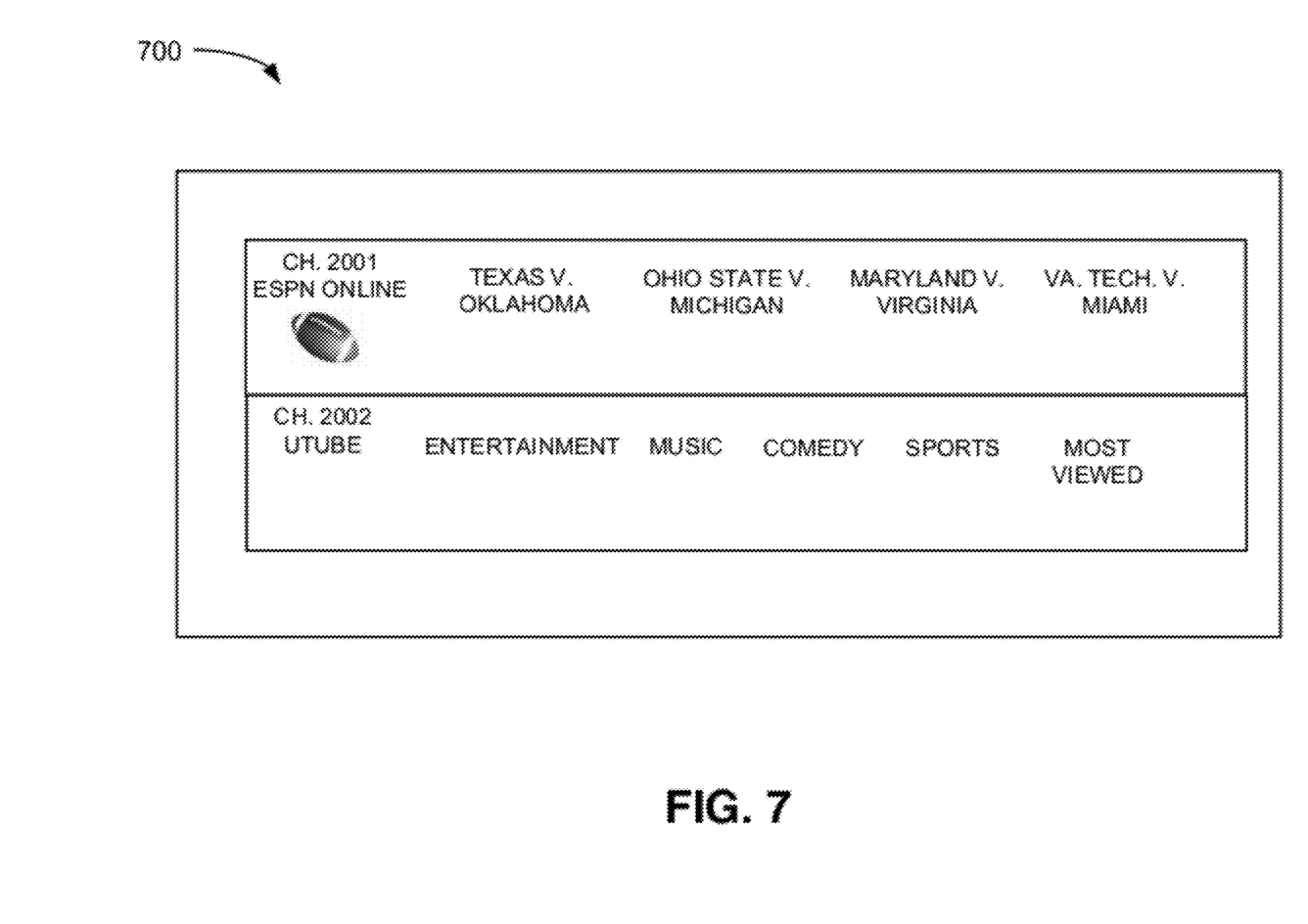
FIG. 7 illustrates a portion of a programming guide in accordance with an exemplary implementation.

For example, FIG. 7 illustrates a portion of a program guide 700 according to an exemplary implementation. As illustrated in FIG. 7, program guide 700 displays channel 2001 (i.e., online espn). Channel 2001 is listed along with identifiers, labels or thumbnails for four football games currently being played (i.e., Texas v. Oklahoma, Ohio State v. Michigan, Maryland v. Virginia and Virginia Tech v. Miami, in this example). The user may use remote control 130 and select one of the four games by scrolling to the game of interest and pressing "OK" on remote control 130. Browser logic 340 may then forward the selection to content provider 150 and content provider 150 may stream the selected game to communication device 110. Communication device 110 may then output the game to user device 120.

As further illustrated in FIG. 7, channel 2002 is displayed, along with the label utube. In addition, a number of thumbnails or identifiers are also listed (i.e., entertainment, music, comedy, sports, and most viewed, in this example). These thumbnails may correspond to categories or selections available on the web site www.youtube.com. Similar to the description above for channel 2001, the user may scroll to the appropriate thumbnail, such as "music" and press "OK" on remote control 130. Browser logic 340 may then forward the selection to the appropriate content provider and receive the selected content. Communication device 110 may then output the received content to user device 120. In this manner, communication device 110 may further enhance the usability of the program guide by automatically identifying content available at any given time from a particular online content provider that has multiple feeds that are available and provide identifiers associated with the available content in the program guide.

In some implementations, browser logic 340 may poll the various online content providers listed in table 500 to identify whether multiple feeds/content are available and automatically update the program guide at various intervals. In this manner, when the user views an online channel that includes multiple feeds/content, the listing in the program guide will reflect the currently available selections. For example, if the Texas v. Oklahoma game displayed in program guide 700 with Channel 2001 is no longer available (e.g., the game has ended), communication device 110 may no longer display that particular thumbnail/link in the program guide with the thumbnails for Channel 2001. However, if another football game is currently available (e.g., Florida v. Georgia), a thumbnail or link associated with that game may be displayed in program guide 700 below or adjacent the listing for Channel 2001.

In other implementations, such as when the online channel includes too many selections to display on the program guide, the user may set user profile information to facilitate the display of information of interest in the program guide. For example, as discussed above, online channel 2002 may correspond to www.youtube.com. This web site may include thousands of available video feeds. In one implementation, the user may enter information via the GUI provided by user interface logic 320 indicating that he/she would like music-related feeds displayed in the program guide for Channel 2002. In this case, browser logic 340 may access the web site www.youtube.com and identify video feeds associated with a music-related category. Browser logic 340 may insert thumbnails or links associated with the music-related category in the program guide. For example, browser logic 340 (or control logic 310) may insert a predetermined number of thumbnails or links in program guide 700 that correspond to music related video feeds for Channel 2002 that are currently available for downloading or playing.

In still other instances, when the online channel/web site includes a number of available selections, browser logic 340 may select a predetermined or default number of the available selections. For example, browser logic 340 may identify a default number of thumbnails (e.g., two, four, six, etc.) associated with available content and display the default number of thumbnails alongside the particular channel in the program guide. In this case, browser logic 340 may select the first "X" number of links/feeds available at the content provider's site (e.g., content provider 150), where X is the default or predefined number. The number of thumbnails displayed by browser logic 340 may also be based on the amount of space available on the program guide to allow the user to easily view the default number of selections.

Implementations described herein allow a user to customize a programming guide to include listings associated with online content that may be of interest to the user. The user may then view online content in a similar manner in which the user views conventional television programs. In addition, in an exemplary implementation, when an online content provider has a number of different video feeds that are available for downloading or viewing, the programming guide may display all or some of the multiple selections that are available from the online content provider.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, a user may access online content in a manner similar to that for viewing broadcast television content. In some instances, however, the online content may be pay-per-view content. In this case, the user may interact with the content provider (e.g., content provide 150) and/or service provider 140 to submit payment information (e.g., credit card information) prior to receiving the selected content.

In addition, features have been described above with respect to accessing Internet accessible web sites that provide content. In other implementations, the content may be other types of online content, such as Internet protocol television (IPTV) content provided by a content provider.

Further, while series of acts have been described with respect to FIGS. 4 and 6, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A device, comprising:
a memory;
first communication logic configured to receive television programming from a service provider;
second communication logic configured to receive content from at least one online content provider via the Internet; and
user interface logic configured to:
provide a user interface comprising a programming guide, the programming guide including listings associated with a plurality of channels provided by the service provider and at least a first listing associated with content provided by a first one of the at least one online content provider, and
receive, from a user, a selection corresponding to the first listing associated with content provided by the first online content provider, and
wherein the second communication logic is further configured to:
signal the first online content provider to provide content corresponding to the selection, and
receive the content from the first online content provider, and
wherein the user interface logic is further configured to:
receive an input corresponding to a request to add a listing in the programming guide associated with a second online content provider,
provide, via the user interface and in response to the request to add a listing, a request for the user to provide a name, and at least one of a channel number or logo associated with the second online content provider,
receive, from the user, text corresponding to the name and information identifying at least one of the channel number or logo associated with the second online content provider,
store the received text and information in the memory, include the name and the at least one of the channel number or logo of the second online content provider in the programming guide,
receive, from the user, information identifying at least one category of content provided by the second online content provider,
wherein the second communication logic is further configured to:
communicate with the second online content provider, at a first time, to determine whether a plurality of feeds are available from the second online content provider,
display, via the programming guide, a plurality of listings for the second online content provider, in response to determining that a plurality of feeds are available from the second online content provider, wherein each of the plurality of listings is associated with the information identifying the at least one category of content,
display, via the programming guide, a single listing for the second online content provider, in response to determining that a plurality of feeds are not available from the second online content provider, and
communicate with the second online content provider, at a second time in response to determining that a plurality of feeds are available from the second online content provider, to update the plurality of listings based on the availability of the plurality of feeds at the second time.

2. The device of claim 1, wherein the text comprises a uniform resource identifier, and
wherein the second communication logic is further configured to:
retrieve the uniform resource identifier from the memory when the user selects the second online content provider from the programming guide, and
access the second online content provider using the uniform resource identifier.

3. The device of claim 1, wherein when providing the request, the user interface logic is further configured to:
request the name, channel number and logo associated with the second online content provider.

4. The device of claim 3, wherein when receiving information, the user interface logic is further configured to:
receive, from the user, the text corresponding to the name and information identifying the channel number and the logo associated with the second online content provider, and
include the name, channel number and logo of the second online content provider in the programming guide.

5. The device of claim 1, wherein the second communication logic is further configured to:
output the received content to an output device for display.

6. The device of claim 1, wherein the user interface logic is further configured to:
receive information associated with a plurality of online content providers from the user via the user interface, and
modify the programming guide to include information corresponding to the plurality of online content providers.

7. The device of claim 1, wherein the first online content provider is configured to provide a plurality of selections corresponding to a plurality of content, and wherein the user interface logic is further configured to:

receive a selection corresponding to a first one of the plurality of content, and wherein the second communication logic is further configured to:
signal the first online content provider to provide the first content, and
receive, from the first online content provider, the first content.

8. The device of claim 1, wherein the first online content provider is configured to provide a plurality of selections corresponding to a plurality of content, and wherein the second communication logic is further configured to:
identify the plurality of content, and
automatically, and without further input from the user, display information associated with the plurality of content in the programming guide.

9. The device of claim 8, wherein when automatically displaying information associated with the plurality of content, the second communication logic is configured to:
identify a second plurality of feeds that are simultaneously available from the first online content provider, and
display, without further input from the user, the second plurality of feeds as selectable thumbnails or links in the programming guide with the listing for the first online content provider.

10. The device of claim 1, wherein the device comprises at least one of a set top box or a device including a cable or television card configured to receive television programming.

11. A method, comprising:
providing a programming guide including listings associated with a plurality of channels provided by a television service provider;
receiving, from a user, input corresponding to a request to add a first listing in the programming guide associated with an online content provider;
providing, in response to the request, a user interface, the user interface requesting that the user add information associated with the online content provider, wherein the information includes at least one of a name, channel number or logo associated with the online content provider;
receiving, from the user via the user interface, text corresponding to the name and information identifying at least one of the channel number or logo associated with the online content provider;
storing the received text and information in a memory;
receiving, from the user, information identifying at least one category of content;
modifying the programming guide to include the first listing associated with the online content provider, wherein the first listing associated with the online content provider includes the name and the at least one of the channel number or logo of the online content provider;
communicating with the online content provider, at a first time, to determine whether a plurality of content is available from the online content provider;
displaying, via the programming guide, a plurality of listings for the online content provider, in response to determining that a plurality of content is available from the online content provider, wherein the plurality of listings correspond to the identified at least one category of content;
displaying, via the programming guide, a single listing for the online content provider, in response to determining that a plurality of content is not available from the online content provider; and
communicating with the online content provider, at a second time in response to determining that a plurality of content is available from the online content provider, to update the plurality of listings based on the availability of the plurality of content at the second time.

12. The method of claim 11, further comprising:
receiving, from the user, a selection corresponding to the first listing associated with the online content provider;
signaling the online content provider to provide content corresponding to the selection;
receiving the content from the online content provider; and
outputting the content for display.

13. The method of claim 12, further comprising:
receiving, from the user via the user interface, text providing an identifier associated with the online content provider, wherein the identifier comprises a uniform resource identifier; and
storing the identifier in the memory, and wherein signaling the online content provider comprises:
retrieving the uniform resource identifier from the memory in response to the user selecting the first listing associated with the online content provider, and
accessing the online content provider using the uniform resource identifier.

14. The method of claim 11, wherein the providing a user interface further comprises:
requesting at least two of the name, channel number or logo associated with the online content provider; and wherein the receiving the text and the information comprises:
receiving, from the user, information corresponding to the name, channel number and logo associated with the online content provider; and
including the name, channel number and logo of the online content provider in the programming guide.

15. The method of claim 11, further comprising:
receiving information associated with a plurality of online content providers from the user via the user interface; and
inserting information corresponding to the plurality of online content providers in the programming guide.

16. The method of claim 11, wherein the plurality of listings correspond to the plurality of content that is available from the online content provider at the first time, the method further comprising:
automatically displaying, without further input from the user, information identifying the plurality listings along with listings for other ones of the plurality of channels;
receiving a selection corresponding to a first one of the plurality of listings;
signaling the online content provider to provide first content corresponding to the first listing; and
receiving, from the online content provider, the first content.

17. The method of claim 11, further comprising:
receiving user profile information from the user;
identifying the at least one category of content based on the user profile information; and
automatically displaying the plurality of listings via the programming guide.

18. A non-transitory computer-readable medium having stored thereon sequences of instructions which, when executed by at least one processor, cause the at least one processor to:

provide a user interface comprising a programming guide, the programming guide including listings associated with a plurality of channels provided by a television service provider and at least a first listing associated with content provided by a web site;

provide, via the user interface, a data input box requesting a user to provide a name and at least one of a channel number or logo to be associated with content provided by the web site;

receive, from the user, text provided in the data input box corresponding to the name and information identifying the at least one of the channel number or logo to be associated with content provided by the web site;

associate the name and the at least one of the channel number or logo with content provided by the web site;

include the name and the at least one of the channel number or logo in the programming guide;

receive, from the user, information identifying a category of content;

communicate with the web site, at a first time, to determine whether a plurality of content is available from the web site;

display, via the programming guide, a plurality of listings for the web site, in response to determining that a plurality of content is available from the web site, wherein the plurality of listings correspond to the identified category of content;

display, via the programming guide, a single listing for the web site, in response to determining that a plurality of content is not available from the web site;

communicate with the web site, at a second time in response to determining that a plurality of content is available from the web site, to update the plurality of listings based on the availability of the plurality of content at the second time;

receive a selection corresponding to the first listing associated with content provided by the web site;

forward a signal to the web site in response to the selection; and receive the content from the web site.

19. The non-transitory computer-readable medium of claim 18, further including instructions for causing the at least one processor to:

receive an input corresponding to a request to add a listing in the programming guide associated with a second web site;

provide a request to the user to add information associated with the second web site;

receive, from the user, an identifier associated with the second web site and at least two of a name, channel number or logo for the second web site; and insert information associated with the second web site and the at least two of the name, channel number or logo in the programming guide.

20. The device of claim 1, wherein when communicating with the second online content provider, at the second time, to update the plurality of listings, the second communication logic is configured to:

identify a second one of the plurality of feeds that is not available from the second online content provider at the second time, delete a second listing corresponding to the second feed from the programming guide, identify a third feed that is available from the second online content provider at the second time, and add a third listing identifying the third feed to the programming guide.

21. The method of claim 11, wherein communicating with the online content provider, at the second time, to update the plurality of listings, comprises:

identifying a second one of the plurality of content that is not available from the online content provider at the second time, deleting a second listing corresponding to the second content from the programming guide, identifying a third content that is available from the online content provider at the second time, and adding a third listing identifying the third content to the programming guide.

* * * * *